United States Patent [19]
Albertsen

[11] 4,127,286
[45] Nov. 28, 1978

[54] CONCENTRIC PIPE COUPLING

[75] Inventor: Peter S. Albertsen, Corning, N.Y.

[73] Assignee: Corning Glass Works, Corning, N.Y.

[21] Appl. No.: 840,530

[22] Filed: Oct. 11, 1977

[51] Int. Cl.² ............................................. F16L 53/00
[52] U.S. Cl. .................. 285/41; 285/133 R; 285/363; 285/DIG. 12
[58] Field of Search ............ 285/41, 133 R, 138, 285/DIG. 12, 133 A, 47, 55, 363, 414, DIG. 5, 45

[56] References Cited

U.S. PATENT DOCUMENTS

| | | | |
|---|---|---|---|
| 3,799,584 | 3/1974 | Slocum | 285/45 |
| 3,998,477 | 12/1976 | Delahaye | 285/133 R |
| 4,017,102 | 4/1977 | Henderson | 285/41 |

FOREIGN PATENT DOCUMENTS

| | | | |
|---|---|---|---|
| 1,251,205 | 10/1971 | United Kingdom | 285/55 |

*Primary Examiner*—Dave W. Arola

*Attorney, Agent, or Firm*—John P. DeLuca; Burton R. Turner; Clarence R. Patty, Jr.

[57] ABSTRACT

There has been provided a coupler for joining lengths of concentric pipe. A sleeve member receives the pipes in spaced relation therein, with an end of the concentric inner pipe forward of the end of the outer pipe. A forward annular flange portion of said sleeve member is concentric with the pipes and extends radially inward as well as outward of the sleeve member. A rearward face of said flange portion faces the forward end of the outer pipe and is spaced away therefrom by a selected length of said tail portion forming an annular groove bounded by the outer pipe end and inner wall of said tail portion of the selected length and the rear face of the flanged portion. A compressible O-ring type elastomer seal is disposed in the annular groove and extends radially inward of said outer pipe. A gasket is concentrically sleeved between said O-ring seal and outer wall of the inner pipe. In compression, the O-ring seal and gasket form a circumferential seal about the inner pipe.

8 Claims, 5 Drawing Figures

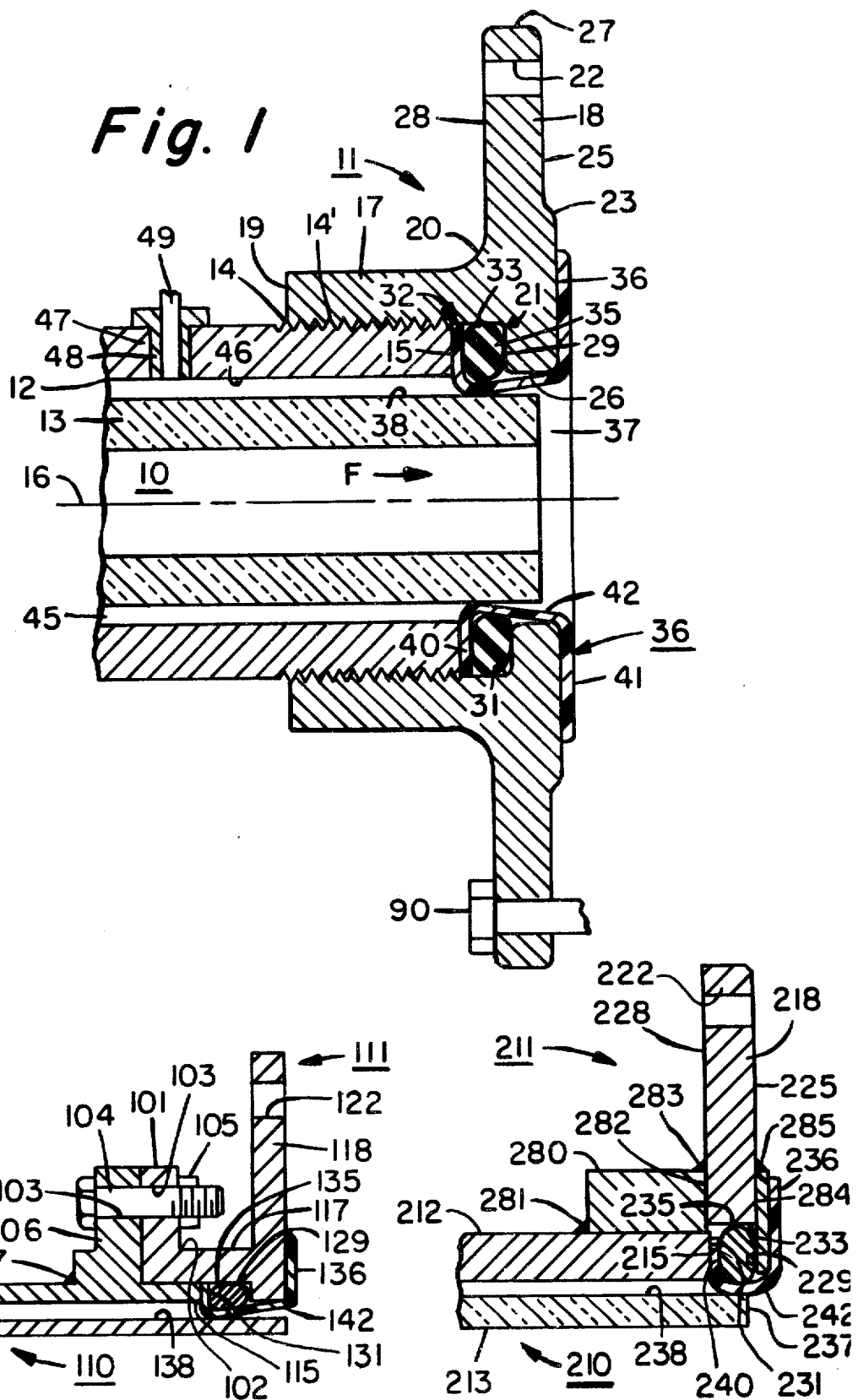

CONCENTRIC PIPE COUPLING

BACKGROUND OF THE INVENTION

This invention relates to a coupler for concentric armored piping and in particular to a device which is adapted to provide a secure circumferential seal between the pipes. The coupler facilitates the field fabrication of concentric piping systems.

In industrial chemical processes, corrosive fluids are routinely handled by reinforced armored glass tubing, glass frit lined steel tubing, or polymer resin (e.g. TEFLON ®) lined steel tubing. Each of such systems operate satisfactorily over a great range of applications, however, there are certain disadvantages to each of the systems which the present invention seeks to obviate.

For example reinforced glass tubing may be damaged by impact. The reinforcing, usually fiberglass wrapping, is intended mainly to protect the surface of the glass against abrasion and to contain leaks caused by a broken glass lining for a limited period until a repair can be affected. Furthermore, joining one section of such reinforced pipe with another requires a complex and rather expensive coupler which is mated with a formed end of the pipe. In this connection, it should be noted that, the formed end is subject to considerable load as transferred through the coupling mechanism directly to the glass. In addition, the increased pipe wall thickness at the formed end is target for stress concentration due to temperature variants across the pipe wall. Special equipment is neccessary to form new pipe ends for those field fabrication situations where standard lengths cannot be used.

Where it is necessary to have the advantages of corrosive resistant glass as a conduit for industrial chemicals, bonded glass frit lined steel pipe may be used. A lining of this sort may develop microscopic pores which in turn provide leach paths for corrosive chemicals. The outer steel casing, being attacked thereby, may be weakened and ultimately destroyed. Fabrication of nonstandard lengths of such pipe must be done at the manufacturer's facility.

Other attempts to line steel tubing with synthetic polymer resins, such as a product sold under the trademark TEFLON ®, or other corrosion resistant materials of its genre, have met with some success. The lining of these systems are susceptible to permeation. In such cases, the outer jacket may be eaten away from the inside out, going unnoticed until failure. In addition, the plasticity of the liners prevents operation at elevated temperatures and vacuum simultaneously.

Furthermore, with all the aforementioned systems, steam tracing, a process by which the pipe is maintained at a certain temperature for process control, is difficult and inefficient at best, since steam lines are generally run adjacent the process line with tangential contact only, which is neither energy nor cost efficient. The field fabrication methods associated with these systems are at best, troublesome and unreliable.

The apparatus of the present invention has been developed in order to provide a simplified coupling system for concentric armored piping systems, which obviates the field fabrication difficulties, protects the corrosive resistant inner concentric pipe from external impact and permits pressurization and steam tracing of the annular space between the concentric pipes. The system is not limited to a steel jacketed glass piping system, even though such a system is most advantageous for numerous applications. If it were desired to visually observe the fluid passing through the corrosion resistant inner pipe (e.g. glass), it would be possible to utilize the system of the present invention, having an outer pipe of a high impact resistant transparent plastic.

SUMMARY OF INVENTION

There has been provided a coupler for joining lengths of concentric pipe having an annular space therebetween comprising; a sleeve member having a tail portion concentric with an outer one of said concentric pipes, sleeved over one end thereof, and capable of coaxially receiving an end of an inner one of said concentric pipes a selected distance forward of said outer pipe. An annular flange portion formed forwardly of said tail portion, extends radially inwardly and outwardly of said outer pipe and has annular faces axially aligned forwardly and rearwardly of the pipes. An inner annular portion of the rearward face of the flange portion extending radially inward of said outer pipe is spaced away from a forward end thereof, forming an annular groove bounded by the forward end of the outer pipe, the inwardly extending annular portion of the rear face of the flange portion and, a selected length of the inner wall of said tail portion. A compressible O-ring type elastomer seal is disposed in said groove circumferentially about the inner pipe near its forward end; and a gasket, having a rear sleeve portion and a forward flange portion, has its sleeve portion sleeved between the O-ring seal and the outer wall of the the inner pipe. The gasket is formed with its forward flanged end having a rear face which mates with a portion of the annular forward face of the flanged portion. In compression the O-ring seal and gasket form a circumferential seal about the inner pipe.

DESCRIPTION OF THE DRAWINGS

FIG. 1 is a side sectional elevation of a coupler of the present invention fitted over an end of a concentric pipe system.

FIG. 2 is a fragmented side sectional elevation of another embodiment of the present invention illustrating a bolted flange connection with the end of a concentric pipe system.

FIG. 3 is a fragmented side sectional elevation of yet another embodiment of the present invention illustrating a welded coupling between the flange and outer concentric pipe.

DESCRIPTION OF THE PREFERRED EMBODIMENT

Figure 4:
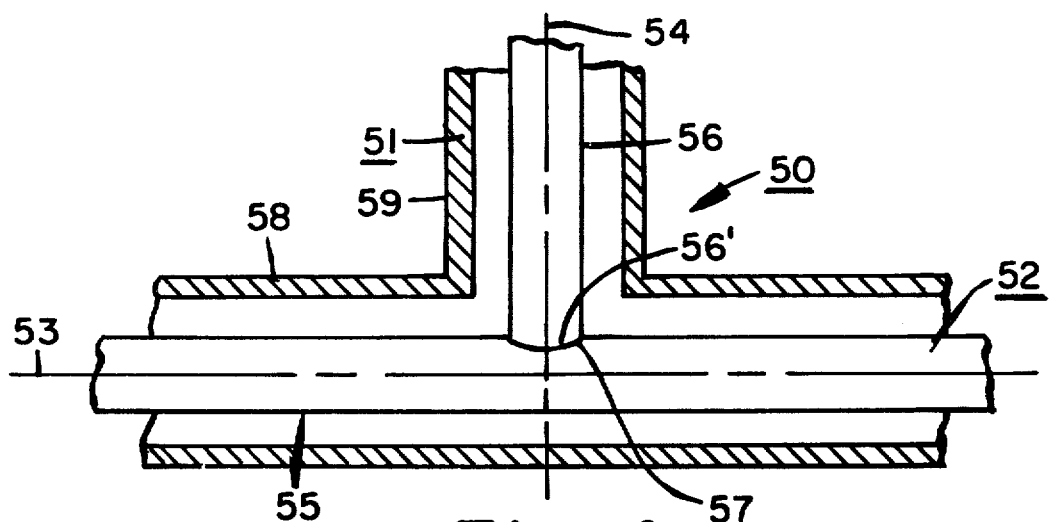
FIG. 4 is a partially sectioned and fragmented side elevation of an exemplary "T" pipe fitting.

FIG. 1 illustrates a side sectional elevation of a concentric piping system 10 having a coupler 11 fitted thereon. The piping system 10 includes an outer armored pipe 12 and a concentric inner pipe 13. The outer pipe 12 may be constructed of steel or other impact resistant material as required. The inner pipe 13 is preferably constructed of glass tubing, but may be fabricated from other suitable materials as the particular application requires. Reference will most frequently be made to a steel outer pipe 12 and glass inner pipe 13 for purposes of illustrating the advantages of the present invention. However it should be understood that the principles of the present invention are not limited to the particular materials discussed.

The outer pipe 12 may be cut to a selected length and threaded at 14 in a factory or field location. A front end 15 of the outer pipe 12 may be flush cut with a flat butt end as illustrated or may be angled relative to an axis 16 in accordance with the type of pipe cutting tool used for forming the end 15.

The coupler 11 is formed with a rearward sleeve portion 17 and a forward flange portion 18. The sleeve portion 17 extends from a rear face end 19 to a forward end near radius 20 and is threaded along 14' with a thread mating with pipe threads 14.

Flange portion 18 has a forward annular face 25 extending from an inner radial face 26 to an outer radial face 27. A portion of flange 18 may be widened at ledge 23 for strength and finishing. The flange portion 18 also has a pair of respective outer and inner rear annular flanges 28 and 29. The outer rear annular face 28 extends from about the radius 20 of the sleeve portion 17 to the outer radial face 27. The inner rear annular flange face 29 extends from a point 21 adjacent an inner wall 33 of sleeve portion 17 to inner radial face 26 of the flange portion 18. The coupler 11 is threaded over the outer pipe 12 by the threads 14 as illustrated and referred to above, forming an annular groove 31, which is bounded by the forward end 15 of the outer pipe 12, the inner rear annular face 29 of the flange portion 18 and a selected length of the inner wall 33 of the sleeve portion 17. The selected length of said inner wall 33 extends from the pipe end 15 at point 32 to the point 21 where the sleeve 17 meets the rear inner face 29 of the annular flange portion 18.

An O-ring type elastomer seal 35, for convenience hereinafter, referred to as O-ring 35, is disposed within said annular groove 31. The O-ring 35 may have an annular cross section profile as shown or conform to other convenient profiles, and is fabricated from a compressible material, such as a natural rubber product, polypropelene or elastic material, suited for the temperature of operation and the type of fluid F. The O-ring 35 tends to expand radially inward of the pipe system 10 towards the axis 16 as the groove 31 is axially reduced in length. An annular gasket 36 is formed and sleeved between the O-ring 35 and outer wall 38 of the inner pipe 13. The gasket 36 is of a length at least sufficient to extend from the forward face 15 of the outer pipe across the groove 31 and inner radial face 26 of the flange portion 18, mating with the front face 25 of the flange portion 18. The gasket 36 may be formed as illustrated with respective rear and forward flanged ends 40 and 41 joined by a sleeve portion 42, or may take on various forms depending upon the type of seal between the O-ring 35 and the outer wall 38 of the inner pipe 13. The inner pipe 13 is sleeved within the sleeve portion 42 of the gasket 36, with a forward end 37 extending beyond the annular groove 31 to some convenient location between the respective front and rear faces 25 and 29 of the flange portion 18.

In operation the coupler 11 may be preassembled with the O-ring 35 disposed in the groove 31 and the gasket 36 sleeved therein with the rear flange 40 properly formed to mate with the forward end 15 of the outer pipe 12, and the front flange end 41 properly formed to mate with the front face 25 of the flange portion 18. The respective outer and inner pipes 12 and 13 may be cut to the proper length in preparation for effectuating the seal. The end 37 of the inner pipe 13 may be fire polished, if so required by the job specification, (while fire polishing the end 37 of glass tube 13 is not always required, it is a suggested procedure.) Threads 14 may be factory or field cut as illustrated. The coupler 11 is then threaded over the outer pipe end 15, via the threads 14 while maintaining inner pipe 13 concentric with the sleeve portion 42 of the gasket 36 so that the pipes 12 and 13, and the coupler 11 are properly aligned relative to axis 16. As the sleeve portion 17 is threaded over the pipe 12, the forward end thereof 15 engages with the rear flanged end 40 of the gasket 36 and squeezes O-ring seal 35 within the groove 31 reducing its axial length, thereby causing radial expansion of O-ring seal 35 and sleeve 42 inwardly and circumferentially about the outer wall 38 of pipe 13 near its end 37. The seal so effected isolates the pipes 12 and 13 such that fluid F is contained within inner pipe 13 and is thereby prevented from attacking the outer pipe 12. The circumferential seal approximately conforms with the width of the groove 31 along the sleeve portion 42 of gasket 36.

The two pipes 12 and 13 are spaced apart from each other in accordance with the particular dimensions of their respective inner and outer diameters. When the pipes 12 and 13 are properly aligned with coupler 11 in place, an isolated annular space 45 is established between the outer wall 38 of the inner pipe 13 and the inner wall 46 of the outer pipe 12. The annular space 45 established by securing the coupler of the present invention in place, provides isolation between the respective outer and inner pipes 12 and 13. The available space 45 may serve another function as will be described further in the specification.

Another similarly formed coupling and concentric pipe system may be mated with the system illustrated in FIG. 1, butting the forward face 25 of the flange portion 18. Bolt holes 22 are formed in flange portion 18 to receive bolts 90 for joining the two sections of concentric piping together (see FIG. 5 and description below for details). It should be appreciated that various clamping mechanisms can be used to butt the two flanges together, a bolt is one of many presently available.

The annular space 45 between the outer pipe 12 and inner pipe 13 serves a function to isolate the inner pipe 13 from impact imparted to the outer pipe 12. Furthermore the annular space 45 may be used for steam tracing or pressurizing exterior wall 38 of inner tube 13 for various industrial processes and process functions. For example, an opening 47 may be bored in the outer pipe 12 near each end thereof (only one of which is shown) and suitably fitted with a nipple 48. The nipple 48 may serve to couple a fluid line 49 for communicating a source of steam, or other working fluid (not shown), into or out of the annular space 45, or from one section of pipe 10 to another (see FIG. 5), or circulate the fluid about the one section. Working fluids at selected temperatures may be used for temperature control of various process steps. Conduits may be temperature conditioned by circulation of heating or cooling working fluid into and out of the annular space 45 between the pipes 12 and 13. Steam tracing practiced in the manner illustrated becomes most efficient and effective since the entire space 45 is filled with working fluid, thereby rendering more of the outer surface 38 of inner pipe 13 as heat exchange surface than with conventional methods.

In addition to the utility of the available space 45 for temperature control, the annular space 45 may be pressurized in order to balance forces which may exist when the inner pipe 13 carries corrosive fluid F (liquid or gas) under pressure. This is especially helpful and desirable if a glass inner pipe 13 is utilized, since the compressive nature of the stress imparted by pressurizing the annular space 45 tends to increase the glass strength against the tensile stress imparted by pressurized fluid within the pipe 13.

Concentric piping systems may require a number of different pipe arrangements including specially fabricated elbows, "Ts" and "Ys", or other appropriate compound fittings as well as the straight lengths illustrated.

Elbow fittings may be formed of concentric pipe as long as care is taken to assure that the inner and outer pipes have respective inner and outer wall diameter ratios which are compatible so that the elbows may be sleeved one within the other. Alternatively a split elbow may also be formed if convenient.

A "T" is a more complex fitting to fabricate. Since it is not possible to sleeve an inner T within an outer T, the latter may be split or sectioned. Alternatively, the former may be formed of separate horizontal and vertical members sleeved separately into corresponding openings of the outer T portion with a welded connection. Such an arrangement is illustrated in FIG. 4. It should also be understood that other fittings, including Y's and compound fittings, may be fabricated in a similar manner, either by separate sleeving of inner components or a split outer shell.

Referring to FIG. 4, a typical T fitting arrangement is illustrated. A concentric T fitting 50 is fabricated from an outer T 51 and an inner T 52. The T 50 has a horizontal axis 53 and a vertical axis 54. The outer T 51 may be formed in a conventional manner as a solid cast and welded piece or may be formed as half sections cut along a plane including the axes 54 and 53. If on the other hand the outer T 51 is of single piece construction, the inner T 52 must be fabricated in parts as discussed above.

A practical approach to the latter problem is to form the inner T 52 as a pair of respective horizontal and vertical cylindrical components 55 and 56. The horizontal component 55 is a tube having a radial opening 57 formed therein. Vertical component 56 is cylindrical member having an end 56' shaped so as to mate with the opening 57 in the horizontal member 55. The tube components 55 and 56 may be sleeved into respective outer horizontal and vertical portions 58 and 59 of outer T 51. Thereafter a torch or other welding device (not shown) may be sleeved into the horizontal pipe member 55 or likewise into the vertical pipe member 56, and a weld made along the interface of the opening 57 and conforming end 56' of the respective horizontal and vertical members 55 and 56. "Ys" may be formed in the same manner except that the axes 53 and 54 are at other than right angles, as is the case with a typical T fitting 50 as illustrated in FIG. 4.

Certain components, mentioned below, with respect to the following alternative embodiments in FIGS. 2 and 3 are numbered similar to those of FIG. 1, but are referred to in respective 100 and 200 series to distinguish the embodiments.

In an alternative embodiment of the present invention, illustrated in FIG. 2, a fragmented side sectional view shows the coupler 111 with a modification to the sleeve portion 117. A rearward upstanding flange 101 is formed at a rearward end 102 of the sleeve portion 117.

The rearward flange 101 has holes 103 bored therein and each hole 103, only one of which is shown, is adapted to receive a bolt 104 and mating nut 105. Rearward of the flange 101 is a similar mating annular flange 106 which is welded or suitably attached to the outer pipe 112 at 107. The flange 106 has holes 103' which are aligned with the holes 103 in the flange 101 and are adapted to receive the bolt 104 to be secured by nut 105. As the bolt and nut 104 and 105 are engaged, the flanges 101 and 106 are drawn toward each other, which in turn draws the tail piece 117 of the coupler 111 rearward of the piping system 110. The rear face 129 of the flange 118 progresses towards the forward face end 115 of the outer pipe 112 squeezing the compressible O-ring 135 against the outer wall 138 of the inner pipe 113, through the sleeved portion 142 of the annular gasket 136.

In FIG. 3, there is illustrated another embodiment of the present invention wherein, the outer pipe 212 has welded thereto a sleeve member 280, a circumferential weld being made at a convenient location as for example at point 281. The sleeve member 280 is attached to flange portion 218 of the coupler 211. Outer rear face 228 of flange portion 218 is butted against front end 282 of the sleeve 280, and a weld is made at 283 circumferentially about the sleeve 280 to securely join the components. In this particular embodiment the flange 211 is fixed with respect to the outer pipe 212 and compression is effected by the use of an annular washer arrangement discussed below.

The front face 225 of the flange portion 218 of coupler 211 has a friction washer 284 which performs a similar function to the respective inner radial portions 29 and 129 of annular flanges 18 and 118 illustrated in the previous embodiments. The washer 284 is welded to the front face 225 of the annular flange 218 at 285 circumferentially around the exterior edge thereof. In this embodiment, the groove 231 is bounded by the forward face 215 of the outer pipe 212, inner radial wall 233 of flange portion 218, and the rear inner face 229 of the washer 284.

The coupler 211 is in fixed relation with the outer pipe 212 such that groove 231 is of fixed geometry. The O-ring seal 235 and the gasket 236 are sized so as to be under compression when inserted within the groove 231, and the inner pipe 213 may be thereafter force-fit within the sleeve portion 242 of the annular gasket 236. It might be necessary to use a sleeving tool to assist in the force-fitting of the tube 213 within the sleeve portion 242 of gasket 236.

Figure 5:
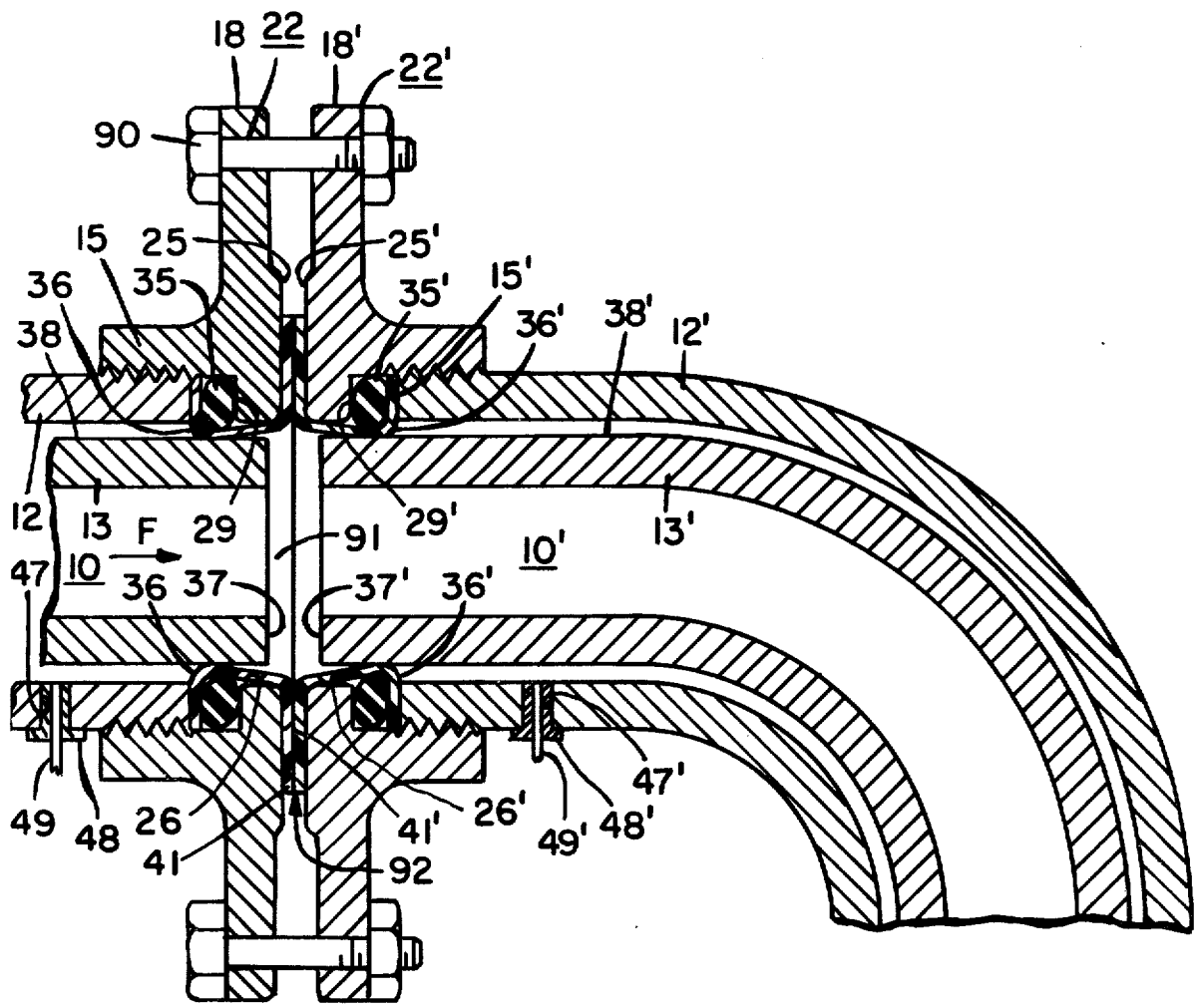
FIG. 5 is a side sectional elevation of the coupler of FIG. 1 mated with a flanged coupler of a next succeeding section of concentric piping.

FIG. 5 shows a typical arrangement wherein the concentric pipe system 10 described in FIG. 1 mates with a downstream system 10' illustrated as a portion of a fragmented elbow. Similar portions of each of the systems 10 and 10' are numbered with the same reference numeral but primed for the downstream system, to the right, to differentiate one from the other. The systems 10-10' are butted together at faces 25 and 25' of the flange members 18, 18'. In the arrangement illustrated in FIG. 5 bolts 90 pass through openings 22, 22' in each of the respective flanges 18, 18' and are used to clamp forward faces 25, 25' of each of the flanges in a butting fashion. A fluid F, passing through the inner pipe members 13–13', is retained by the respective O-ring seals 35, 35' and gaskets 36, 36' engaging with the outer wall 38, 38' of pipe 13, 13'. In a typical setup, as illustrated in FIG. 5, there will be a space 91 formed between the forward ends 37, 37' of the pipes 13, 13', since each of the aforementioned pipes is cut to a selected length, which normally terminates forward of groove 31 and between respective forward and rearward faces 25, 25', and 29, 29', of flanges 18, 18' (note in FIG. 3 pipe end 237 terminates just rearward of washer face 229). Forward faces 41, 41' of gaskets 36, 36' butt as illustrated between the forward faces 25, 25' of the flanges 18, 18' and form a fluid tight seal 92. The gaskets 36, 36' are fabricated from corrosive resistant material, having a resistance to the quality of the fluid F which is similar to that of the piping 13. For example if the pipe 13 is glass material of a selected corrosion resistance the gasket 36 may be a synthetic polymer resin such as a product sold under the trademark TEFLON ®, or other product, having a similar corrosion resistance. In the preferred embodiment, the portion of the gaskets 36–36' exposed to corrosive materials has been limited to that area between the sections 10, 10' in the space 91. The gaskets 36–36' may be fabricated from a relatively heavy gauge flexible sleeving which readily resists corrosion, erosion and abrasion from the fluid F. Likewise the gaskets 36–36' protect the inner radial faces 26–26' of the flange 18-18', not directly shielded by inner pipes 13–13'.

There has been described a coupling system for joining lengths of concentric pipe having an annular space therebetween, wherein a flanged sleeve member forms a groove with a front end of an outer pipe and wherein a compressible O-ring type elastomer seal is disposed in the groove. A sleeved gasket receives the inner pipe therein and forms a compressive circumferential seal between an outer wall of the inner pipe and the O-ring seal. The system may be temperature conditioned or pressurized, by circulating a working fluid into and out of the annular space between the pipes via suitable openings. All of the external piping is shielded from materials flowing through the inner pipe by fabrication of the inner pipe from suitable material while the internal pipe is protected by the presence of the outer pipe fabricated from sufficiently impact resistant material.

While, there have been described, what at present, are considered to be preferred embodiments of the present invention, it will be obvious to those skilled in the art, that various changes and modifications may be made therein without departing from the invention, and is intended, in the appended claims, to cover all such changes and modifications, as fall within the true spirit and scope of the invention.

I claim:

1. A coupler for joining lengths of inner and outer concentric pipes, the inner pipe having an end protruding beyond an end of the outer pipe, the pipes having an annular space therebetween, the coupler comprising:

a flanged sleeve member having a rearward sleeve portion adapted to be located concentrically about and sleeved over the end of the outer one of said concentric pipes, and capable of receiving and maintaining the protruding end of the inner pipe a selected spaced distance forward of said outer pipe;

said flanged sleeve including an annular flange portion, attached to said sleeve portion extending forwardly thereof and adapted to be located forward of said outer concentric pipe end and to extend radially inward and outward of said outer pipe, said flange portion having forward and rearward annular faces, said rearward annular face having a rearward facing inner portion adapted to be spaced forward of said outer pipe end when the outer pipe is positioned within the sleeve portion for forming an inwardly facing annular groove bounded by said outer pipe end, a length of said sleeve portion and said inner rearward facing portion of said flange portion;

a compressible O-ring type seal is adapted to be disposed in said annular groove;

a gasket having a rearward sleeve end and an integrally formed outwardly flanged forward end, said sleeve end of the gasket being somewhat concentric with said flanged sleeve and adapted to be sleeved in radial compression between the O-ring and an outer wall of the inner pipe near its end, said O-ring and gasket adapted to form a circumferential seal about the inner pipe when it is received in said flanged sleeve with the flanged forward end of said gasket in mating relation with the front annular face of the flange portion.

2. The coupler as described in claim 1 wherein, an outer wall of said outer pipe and an inner wall of said sleeve portion are suitably threaded with mating threads for joining said outer pipe end with said sleeve portion for narrowing said groove as the sleeve portion and outer pipe end are threaded together for causing radial compression of said O-ring seal for sealing said sleeve portion of the gasket against the outer wall of the said inner pipe.

3. The coupler as described in claim 1 wherein said coupler further comprises: an upstanding rearward flange portion attached to a rearward end of said sleeve portion; a mating flange portion circumferential with and adapted to be attached to said outer pipe; and means engaging said upstanding rearward flange portion and said mating flange portion for drawing the sleeve portion rearward of the front end of the outer pipe for compressing the groove, gasket, and enclosed O-ring therebetween and causing radial compression of the O-ring for sealing said sleeve portion of the gasket against the outer wall of said inner pipe.

4. The coupler as described in claim 1 wherein said sleeve portion is adapted to be attached to and in fixed relation with the front end of said outer pipe for placing said O-ring under compression and said inner pipe is adapted to be sleeved under compression through said gasket sleeve for effecting the seal.

5. The coupler described in claim 1 wherein at least one opening is provided in the wall of said outer pipe for a working fluid.

6. The coupling system described in claim 5 wherein at least one other opening is provided in the outer wall of the outer pipe for permitting circulation of the said working fluid into and out of said first and second openings and within said annular space between the inner and outer pipes.

7. The coupling system of claim 6 further including: means sealed in said outer pipe openings for coupling an outlet for said working fluid in one pipe section with an inlet for another pipe section.

8. The coupling system described in claim 1 wherein said gasket includes: a rearward flanged portion which is continuous with said sleeved portion and is adapted to engage with a rearward portion of said O-ring seal and the forward end of said outer pipe.

* * * * *